(12) United States Patent
Nakada

(10) Patent No.: US 6,226,043 B1
(45) Date of Patent: May 1, 2001

(54) VIDEO SIGNAL TRANSMISSION METHOD AND VIDEO SIGNAL TRANSMITTING APPARATUS WITHOUT TRANSMITTING OF MULTIPLEX TIMING SIGNAL

(75) Inventor: Yoshihiro Nakada, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/246,700

(22) Filed: Feb. 9, 1999

(30) Foreign Application Priority Data

Feb. 26, 1998 (JP) .................................................. 10-044874

(51) Int. Cl.[7] .................................................. H04N 11/06
(52) U.S. Cl. .................................. 348/488; 348/386.1
(58) Field of Search .................................. 348/488, 490, 348/495, 496, 502, 503, 385, 387, 388, 386.1; 345/150, 213

(56) References Cited

U.S. PATENT DOCUMENTS 3,492,415 * 1/1970 Okada et al. .......................... 348/488

FOREIGN PATENT DOCUMENTS

| 51-85627 | 7/1976 | (JP) . |
| 54-138342 | 10/1979 | (JP) . |
| 61-67090 | 4/1986 | (JP) . |
| 62-56092 | 3/1987 | (JP) . |
| 63-76692 | 4/1988 | (JP) . |
| 64-77287 | 3/1989 | (JP) . |
| 4-13392 | 1/1992 | (JP) . |
| 4-355589 | 12/1992 | (JP) . |

OTHER PUBLICATIONS

Japanese Office Action, dated Sep. 26, 2000, with English language translation of Japanese Examiner's comments.

* cited by examiner

Primary Examiner—Victor R. Kostak
(74) Attorney, Agent, or Firm—McGuireWoods LLP

(57) ABSTRACT

A video signal transmitting apparatus is arranged by a multiplexing unit for multiplexing digital R (red), R (green), B (blue) video signals in a time divisional manner; and for inserting a synchronization corresponding signal into the digital R, G, B video signals during the multiplexing operation to thereby output the digital R, G, B video signals with the synchronization corresponding signal. Since such a timing signal for notifying the multiplex timing is also contained in the transmitted analog R, G, B signals, the timing signal required to demultiplex the digital R, G, B video signals which have been multiplexed in the time divisional manner is no longer transmitted irrespective of the video signal when the video signal is transmitted. Accordingly, neither the transmitting apparatus, nor the transmission path is required by which the timing signal is transmitted.

2 Claims, 1 Drawing Sheet

VIDEO SIGNAL TRANSMISSION METHOD AND VIDEO SIGNAL TRANSMITTING APPARATUS WITHOUT TRANSMITTING OF MULTIPLEX TIMING SIGNAL

BACKGROUND OF THE INVENTION

1. Field of the Invention

The present invention generally relates to a video signal transmission technique, and is more specifically directed to such a video signal transmission technique for multiplexing digital R, G, B signals corresponding to video output signals to output the multiplexed digital R, G, B video signals.

2. Description of the Related Art

Conventionally, as video signal transmitting apparatuses, for example, Japanese Unexamined Patent Application No. 04-013392 opened in 1992 discloses the video transmitting apparatus (related art 1), and Japanese Unexamined Patent Application No. 04-355589 opened in 1992 describes the color video signal transmission method and the color video signals transmitting/receiving apparatus (related art 2). In the video transmitting apparatus of related art 1, the broadband analog R, G, B signals are multiplexed in the 3-phase time divisional manner, and then the multiplexed broadband analog R, G, B signals are transmitted via a single optical fiber. In the color video signals transmitting/receiving apparatus of related art 1, the digital video signal which has been multiplex-modulated in the time divisional manner by the video signal transmitting apparatus is transmitted via a single transmission cable to the video signal receiving apparatus.

As previously explained, when the respective signal components of the R, G, B video signals are multiplexed in the time divisional manner and the multiplexed R, G, B video signals are transmitted, these video signals can be transmitted by employing a single transmitting means. For instance, in the case that each of digital R, G, B video signals is D/A-converted into each of analog R, G, B video signals to be outputted, since these analog R, G, B video signals are multiplexed in the time divisional manner, a total number of D/A converters and a total path number of signal transmission paths can be reduced from 3 to 1.

In these conventional video signal transmitting and/or receiving apparatuses, since the time-division multiplexing technique is employed, the total quantities of the D/A converter and the signal transmission path can be reduced to 1, respectively. However, the timing signal used to notify the timing of the multiplexing operation must be transmitted independently from the transmissions of the three multiplexed R, G, B video signals. Therefore, such a transmitting apparatus for transmitting this timing signal is necessarily required. In other words, on the reception side where the video signals which have been D/A-converted to be transmitted are received, these multiplexed analog video signals are demultiplexed to produce a plurality of original video signals based upon the timing signal indicative of the timing of the multiplexing operation after A/D-converting the video signals.

SUMMARY OF THE INVENTION

An object of the present invention is to provide a video signal transmission method and a video signal transmitting apparatus without transmitting a timing signal irrespective of the video signals to be transmitted. This timing signal is used to notify timing of a multiplexing operation.

To achieve the above-described object, a video signal transmission method, according to a first aspect of the present invention, is featured by that digital R (red), G (green), B (blue) video signals are multiplexed in a time divisional manner, and while the respective digital R, G, B video signals are multiplexed, a synchronization corresponding signal is inserted into said digital R, G, B video signals to thereby output the digital R, G, B video signals with the synchronization corresponding signal.

With employment of the above-described arrangement, in accordance with the video signal transmitting apparatus, the synchronization corresponding signals are transmitted which are contained in the respective R, G, B digital video signals multiplexed in the time divisional manner. As a result, the timing signal used to notify the timing of the multiplexing operation is no longer transmitted irrespective of the digital R, G, B video signals to be transmitted.

Also, to achieve the above-described object, a video signal transmitting apparatus, according to a second aspect of the present invention, is characterized by comprising multiplexing means for multiplexing digital R (red), G (green), B (blue) video signals in a time divisional manner, and for inserting a synchronization corresponding signal into the digital R, G, B video signals during the multiplexing operation to thereby output the digital R, G, B video signals within the synchronization corresponding signal.

BRIEF DESCRIPTION OF THE DRAWINGS

The present invention may best be understood by reference to the following detailed description to be read in conjunction with the drawings, in which.

DETAILED DESCRIPTION OF THE PREFERRED EMBODIMENTS

Referring now to drawings, various preferred embodiments of the present invention will be described in detail.

Arrangement of Video Signal Transmitting Apparatus

Figure 1:
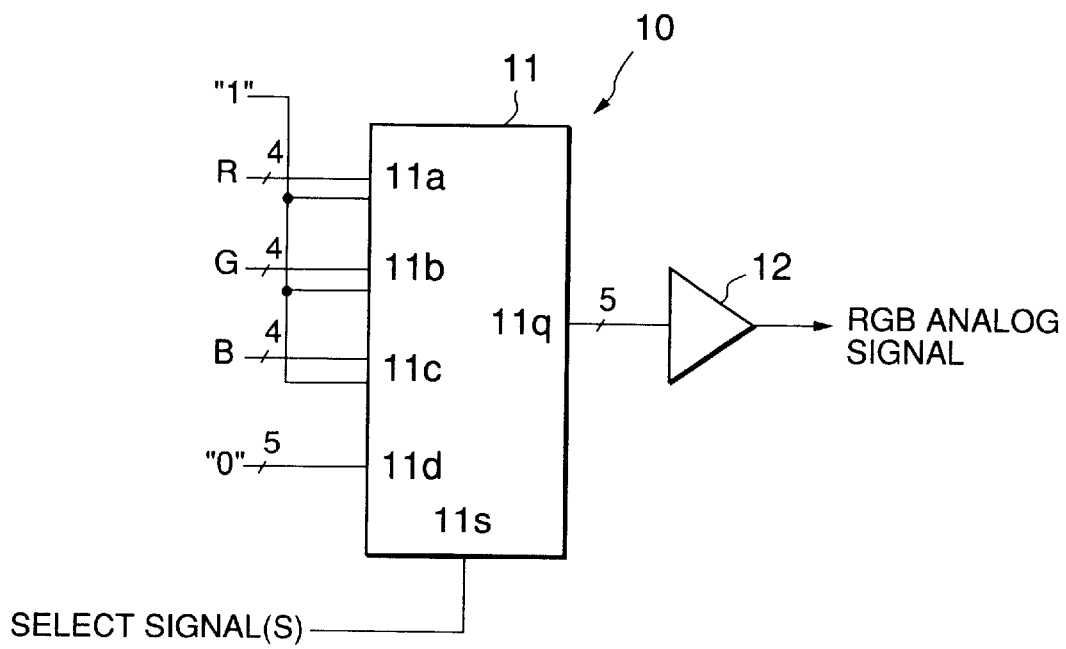
FIG. 1 is a schematic block diagram for representing an arrangement of a video signal transmitting apparatus according to an embodiment of the present invention.

FIG. 1 is a schematic block diagram for indicating an arrangement of a video signal transmitting apparatus 10 according to a preferred embodiment of the present invention. As indicated in FIG. 1, this video signal transmitting apparatus 10 is arranged by a 5-bit multiplexer 11 having 4 inputs, and a D/A converter 12 for converting a digital signal outputted from the multiplexer 11 into an analog signal. It should be understood that each of the R (red), G (greed), B (blue) digital video signals entered into this video signal transmitting apparatus 10 is constructed of 4 bits.

The multiplexer 11 is equipped with 4 sets of 5-bit signal input terminals 11a, 11b, 11c, 11d; 1 set of 5-bit signal input terminal 11q; and 1 set of 1-bit select signal input terminal 11s. This multiplexer 11 multiplexes the respective input signals in the time divisional manner and further inserts a synchronization corresponding signal while multiplexing these digital R, G, B video signals, so that a time division multiplexing signal is produced. The time division multiplexing signal is outputted to the D/A converter 12.

Among the 4 sets of input terminals 11a, 11b, 11c, and 11d, the digital R-video signal is supplied to upper 4 bits of the input terminal 11a. Also, the digital G-video signal is supplied to upper 4 bits of the input terminal 11b, and the digital B-video signal is supplied to upper 4 bits of the input terminal 11c. A digital signal "1" is continuously supplied as a video additional signal to the least significant bit (LSB) of each of these input terminals 11a, 11b, and 11c.

Therefore, a 5-bit-structured video signal constructed of the digital signal "1" at the least significant bit (LSB) thereof, and also the digital R-video signal at the upper 4 bits thereof is supplied to the input terminal 11a. Similarly, a 5-bit-structured video signal constructed of the digital signal "1" at the least significant bit (LSB) thereof, and also the digital G-video signal at the upper 4 bits thereof is supplied to the input terminal 11b. Similarly, a 5-bit-structured video signal constructed of the digital signal "1" at the least significant bit (LSB) thereof, and also the digital B-video signal at the upper 4 bits thereof is supplied to the input terminal 11c. Furthermore, another 5-bit signal, all bits of which are equal to "0", is supplied to the input terminal 11d. This 5-bit signal may constitute a timing signal. The least significant bit (LSB) of this 5-bit timing signal similarly corresponds to a video additional signal.

The multiplexer 11 multiplexes both the respective digital video signals supplied from the respective input terminals 11a, 11b, 11c and the timing signal supplied from the input terminal 11d in response to the select signal entered from the select signal input terminal 11s to output the multiplexed signal as a time-divided multiplex signal from the signal output terminal 11q. The video additional signal has been added to each of the respective digital video signals. Thus, the 5-bit multiplex signal outputted from the multiplexer 11 is supplied to the D/A converter 12 so as to be D/A-converted into the output R, G, B analog signals.

Timing Chart for Input/Output Signals of Video Signal Transmitting Apparatus

Figure 2:
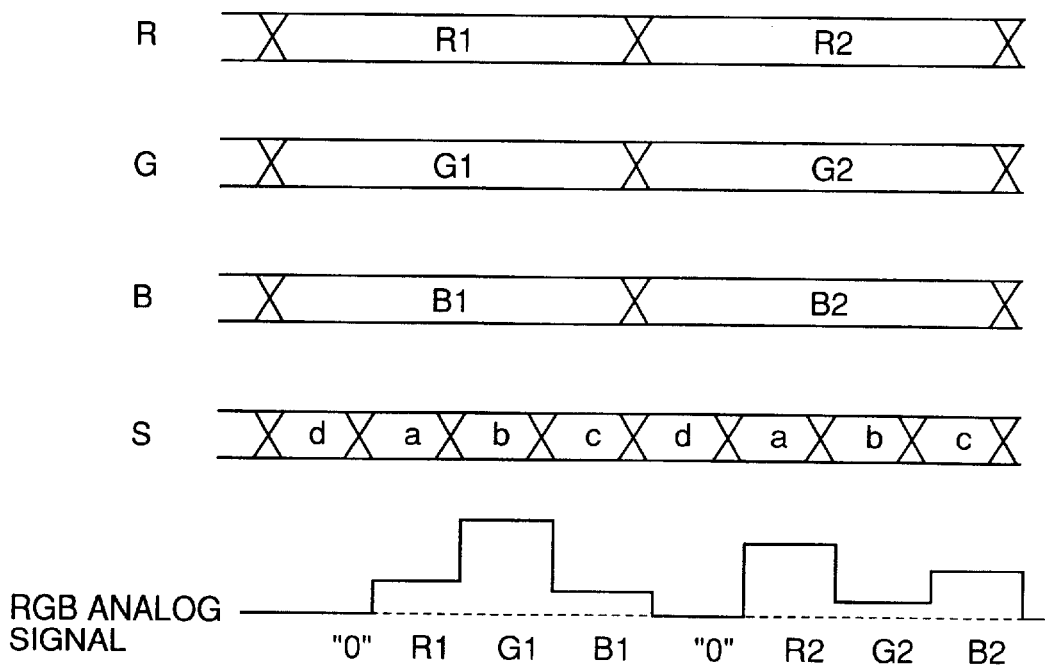
FIG. 2 represents a timing chart of various input/output signals appearing in the video signal transmitting apparatus of FIG. 1.

FIG. 2 is a timing chart for representing the respective input/output signals of the above-described video signal transmitting apparatus shown in FIG. 1.

As indicated in FIG. 2, the multiplexer 11 sequentially switches the respective signals in the order of "d", "a", "b", "c" by the time division executed based upon the select signal within a display time period of one pixel in each of the digital R, G, B video signals inputted to this multiplexer 11, for instance, within an R1 time period, a G1 time period, and a B1 time period. Similarly, the multiplexer 11 sequentially selects the respective digital R, G, B video signals in the order of "d", "a", "b", "c" within the respective R2, G2, B2 time periods and the subsequent time periods. In this time chart, a value "d" of the select signal indicates such a fact that the multiplexer 11 selects the timing signal inputted from the input terminal 11d. Similarly, another value "a" of this select signal represents such a fact that the multiplexer 11 selects the digital R-video signal entered from the input terminal 11a. Also, another value b of the select signal indicates such a fact that the multiplexer 11 selects the digital G-video signal inputted from the input terminal 11b. Similarly, another value "c" of this select signal represents such a fact that the multiplexer 11 selects the digital B-video signal entered from the input terminal 11c.

As a result, a 5-bit signal having all bits of "0" firstly appears from the output terminal 11q of the multiplexer 11. Secondly, a signal R1, the least significant bit (LSB) of which is "1" and the upper 4 bits of which are the digital R-video signal, appears from the output terminal 11q of the multiplexer 11. Thirdly, a signal G1, the least significant bit (LSB) of which is "1" and the upper 4 bits of which are the digital G-video signal, appears from the output terminal 11q of the multiplexer 11. Fourthly, a signal B1, the least significant bit (LSB) of which is "1" and the upper 4 bits of which are the digital B-video signal, appears from the output terminal 11q of the multiplexer 11. Subsequently, R, G, B signals to which the timing signal and the video addition signal have been added are outputted in a similar manner in the above-described order and further outputted in a single unit. In other words, "0" equals to the timing signal is positioned at the frontmost portion of the signal stream.

Then, analog R, G, B video signals are outputted from the D/A converter 12 by D/A-converting the digital R, G, B video signals which are repeatedly outputted from the output terminal 11q of the multiplexer 11 in this order of "d", "a", "b", "c" and in a single unit.

As a consequence, since the least significant bit (LSB) of each of the digital R, G, B video signals is equal to "1", even when all of the 4 bits of each of these digital R, G, B video signals are equal to "0", each of the input signals "a", "b", "c" entered to the multiplexer 11 becomes "00001" H. To the contrary, since all of the 5 bits of the timing signal are equal to "0", the input signal "d" becomes "00000"H.

In other words, even when each of the digital R, G, B video signals has any value, the analog R, G, B video signals outputted from the D/A converter 12 are outputted as such signals that a top of an output signal stream from the multiplexer 11 becomes the lowest value (value "00000") during a time period when the select signal has the value "d". Also, this output of such a value "00000" is periodically repeated (see FIG. 2).

Next, a description will be made of such a case that the analog R, G, B video signals outputted from the D/A converter 12 are received.

As previously described, within such a time period during which the select signal has the value "d", the analog R, G, B video signals outputted from the D/A converter 12 own the lowest values. Similarly, the lowest values are periodically repeated. On the reception side, this time period during which the analog R, G, B signals of this A/D converter 12 have the lowest value is detected to produce a basic clock. Furthermore, a signal having a frequency 4 times higher than that of this basic clock is produced by such as a PLL (phase-locked loop, i.e, not shown).

First, the received analog R, G, B video signals are A/D-converted by an A/D converter (not shown) into digital R, G, B video signals corresponding thereto. The converted digital R, G, B video signals contain a 5-bit timing signal "D", a digital R-video signals "Ar", a digital G-video signal "Bg", and a digital B-video signal "Cb" in the time divisional manner. The timing signal "D" has all 5 bits of "0". The digital R-video signal "Ar" is constructed by that the least significant bit (LSB) thereof is "1", and the upper 4 bits thereof are the digital R-video signal. The digital G-video signal "Bg" is constructed by that the least significant bit (LSB) thereof is "1", and the upper 4 bits thereof are the digital G-video signal. Also, the digital B-video signal "Cb" is constructed by that the least significant bit (LSB) thereof is "1", and the upper 4 bits thereof are the digital B-video signal.

Next, the converted digital R, G, B video signals are demultiplexed by employing a demultiplexer (not shown) into a plurality of original video signals (namely, video signals before being multiplexed). When each of the digital R, G, B video signals "Ar", "Bg", "Cb" is derived, these digital R, G, B video signals may be sequentially latched by using the basic clock and the signal having the frequency 4 times higher than that of this basic clock.

As previously described, before the respective digital R, G, B video signals are converted into the analog R, G, B video signals, these digital R, G, B video signals are multiplexed, so that the respective digital R, G, B video signals are arranged in the time divisional manner. In addition, while these digital R, G, B video signals are multiplexed, both the video additional signal and the synchronization corresponding signal constructed of the timing signal are inserted into these digital R, G, B video signals. As a result, the digital multiplexed R, G, B video signals and furthermore the multiplex timing can be notified to the reception side where the transmitted analog R, G, B video signals are received.

As a consequence, in accordance with the video signal transmitting apparatus of the present invention, a total signal line of the D/A converter and also a total path number of the transmission path can be reduced from 3 to 1. For instance, the transmission cable may be constituted by a single cable, resulting in low cost. In addition, since such a timing signal for notifying the multiplex timing is also contained in the transmitted analog R, G, B video signals, the timing signal required to demultiplex the digital R, G, B video signals which have been multiplexed in the time divisional manner is no longer required to be transmitted independently from the video signal when the video signal is transmitted. Accordingly, neither the transmitting apparatus, nor the transmission path is required by which the timing signal is transmitted.

As apparent from the above description, although the bit number of each of these digital R, G, B video signals is selected to be 4 bits, the present invention is not limited to 4 bits. Alternatively, any bit numbers may be employed for these digital R, G, B video signals.

Also, in the above-described embodiment, the video additional signal having the value of "1" is selected to be the least significant bit (LSB) of each of the digital R, G, B video signals. Alternatively, this video additional signal having the value of "1" is selected to be the most significant bit (MSB) of each of the digital R, G, B video signals. Also, the timing signal of "0" is located at the frontmost portion of the signal stream in the above-described embodiment, but alternatively may be located at the lastmost portion of this signal stream.

Moreover, the value of the video additional signal may be selected to be "0", and the value of the timing signal may be selected to be "11111". In this alternative case, since all of the 5 bits of this timing signal become "1", such a time period during which the input signal "d" is outputted is outputted as the highest value. Also, in this alternative case, since the R, G, B video signals to which the video additional signal has been added do not exceed the value "10000", the timing signal may be easily detected from the signal multiplexed in the time divisional manner, as compared with the above-described embodiment.

While the present invention has been described in detail, the synchronization corresponding signal is outputted which is contained in the respective R, G, B digital video signals multiplexed in the time divisional manner. As a consequence, such a timing signal for notifying the multiplex timing is no longer transmitted irrespective of the video signals to be transmitted.

Modifications of the invention herein disclosed will occur to a person skilled in the art and all such modifications are deemed to be within the scope of the invention as defined by the appended claims.

What is claimed is:

1. A method of multiplexing digital R (red), G (green), B (blue) video signals in a time divisional manner, comprising the steps of:

outputting a video additional signal having one value of binary values of a digital signal and appended to each of said digital R, G, B video signals;

appending said video additional signal to one of a least significant bit (LSB) side of each of said digital R, G, B video signals or a most significant bit (MSB) side;

outputting a timing signal having the other value of said binary values of the digital signal and arranged in each of signals streams in which each of said digital R, G, B video signal is arranged in a time divisional manner and appending said timing signal into one of a formost portion of said signal stream or a last most portion.

2. An apparatus for multiplexing digital R (red), G (green), B (blue) video signals in a time divisional manner, comprising:

outputting means for outputting a video additional signal having one value of binary values of a digital signal and appended to each of said digital R, G, B video signals;

appending means for appending said video additional signal to one of a least significant bit (LSB) side of each of said digital R, G, B video signals or a most significant bit (MSB) side;

outputting means for outputting a timing signal having the other value of said binary values of the digital signal and arranged in each of signal streams in which each of said digital R, G, B video signal is arranged in a time divisional manner; and appending means for appending said timing signal into one of a foremost portion of said signal stream or a last most portion.

* * * * *